United States Patent [19]

Fujimoto

[11] Patent Number: 5,550,645
[45] Date of Patent: Aug. 27, 1996

[54] IMAGE SIGNAL RECORDING APPARATUS HAVING HIGH-FINENESS RECORDING MODE AND NORMAL RECORDING MODE

[75] Inventor: Ryo Fujimoto, Kanagawa-ken, Japan

[73] Assignee: Canon Kabushiki Kaisha, Tokyo, Japan

[21] Appl. No.: 833,642

[22] Filed: Feb. 10, 1992

Related U.S. Application Data

[63] Continuation of Ser. No. 344,305, Apr. 27, 1989, abandoned.

[30] Foreign Application Priority Data

May 6, 1988 [JP] Japan .................................. 63-111333

[51] Int. Cl.$^6$ .............................. H04N 5/76; H04N 5/225
[52] U.S. Cl. .......................... 358/335; 348/207; 348/264; 360/33.1
[58] Field of Search .................................... 358/335, 310, 358/906, 909.1; 360/33.1, 35.1; 348/207, 262, 263, 264, 265; H04N 5/76, 5/225, 5/92, 5/78, 5/781, 5/782, 5/783, 9/79

[56] References Cited

U.S. PATENT DOCUMENTS 4,745,486  5/1988  Ohira et al. .............................. 358/310
4,811,118  3/1989  Katoh et al. ............................. 358/906
4,862,292  8/1989  Enari et al. ............................... 360/23

OTHER PUBLICATIONS

Tanaka et al., *An Elecronic Still Camera System*, Dec., 1986, pp. 345–354.

*Primary Examiner*—Thai Q. Tran
*Attorney, Agent, or Firm*—Robin, Blecker, Daley and Driscoll

[57] ABSTRACT

An image signal recording apparatus for recording on a recording medium an image signal obtained by sensing the image of an object is arranged to generate first and second sensed image signals having a first resolution, to generate a third sensed image signal having the first resolution by performing a computing process on the first and second sensed image signals, to form a first recording image signal corresponding to the first and second sensed image signals and a second recording image signal corresponding to the third sensed image signal, and to selectively record on the recording medium the first recording image signal or the second recording image signal. The invented apparatus arranged in this manner retains interchangeability with the conventional format and yet is capable of recording on the recording medium an image signal with a higher degree of image quality than the conventional apparatus.

12 Claims, 7 Drawing Sheets

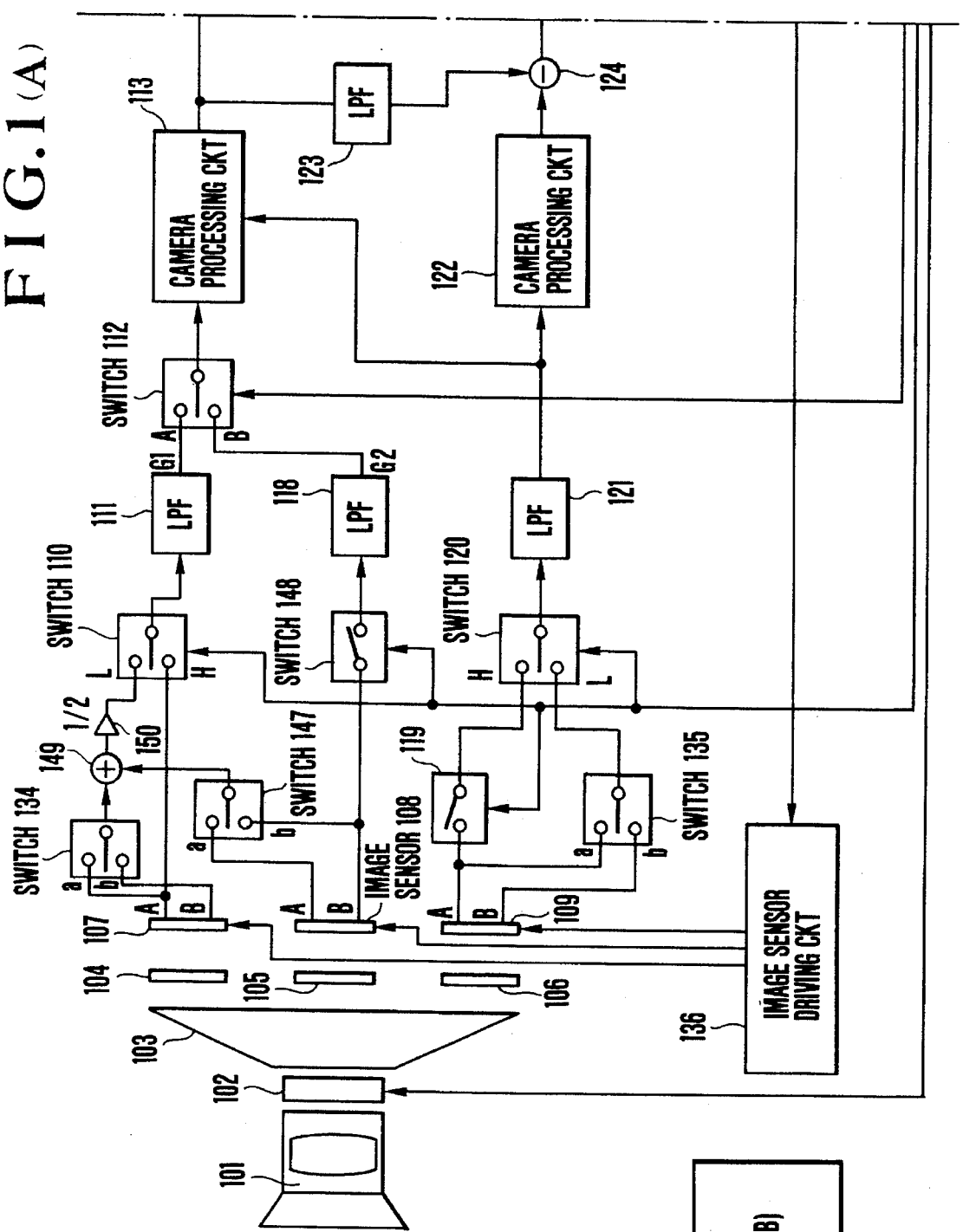

IMAGE SIGNAL RECORDING APPARATUS HAVING HIGH-FINENESS RECORDING MODE AND NORMAL RECORDING MODE

This is a continuation application under 37 CFR 1.62 of prior application Ser. No. 334,305, filed Apr. 27, 1989, now abandoned.

BACKGROUND OF THE INVENTION

1. Field of the Invention

This invention relates to an apparatus for recording on a recording medium an image signal obtained by sensing the image of an object to be photographed.

2. Description of the Related Art

The recording and reproducing apparatus of the kind called an electronic still video camera is arranged to record a video signal obtained by image sensing means on a recording medium such as a magnetic disc or the like and to reproduce the record from the medium. The electronic still video cameras known at present are arranged merely to record and reproduce a TV signal conforming to a currently prevalent television system, such as the NTSC system. In the case of the still video camera adapted for the NTSC system, the number of scanning lines is 525 per frame and the horizontal resolution is only 350 TV or thereabout.

During recent years, video tape recorders have become capable of giving a higher degree of picture quality. As a result, the electronic still video camera is now strongly desired to be capable of giving also a higher image quality. In the case of the still video camera, it is a still image that is to be recorded and reproduced. The currently attainable degree of resolution is insufficient. Compared with a picture taken by the silver-halide type camera or the like, the quality of a picture obtained by printing a video signal reproduced from a magnetic disc is by far inferior to that of the former.

Meanwhile, a novel television system of a high picture quality called a high-definition television system has lately been proposed and is now under experimentation. For an electronic still video camera capable of matching with the new television system, the currently prevalent recording and reproduction format is hardly adoptable as it is. Further, even if a new format is adopted for an electronic still video camera to enable the camera to match with the new television system, it would be difficult to have interchangeability between cameras adapted for new and old formats.

SUMMARY OF THE INVENTION

It is a general object of this invention to provide an image signal recording apparatus which is capable of solving the above-stated problems.

It is a more specific object of the invention to provide an image signal recording apparatus which is capable of recording an image signal with a higher degree of picture quality than the conventional apparatus and yet has interchangeability with the conventional format.

Under this object, an image signal recording apparatus arranged, according to this invention in one mode of embodiment thereof, to record on a recording medium an image signal obtained by sensing an image of an object to be photographed comprises:

first image sensing means for generating a first sensed image signal having a first resolution by sensing the image of the object;

second image sensing means, having picture elements allocated for the object differently from the first image sensing means, for generating a second sensed image signal having the first resolution;

third sensed image signal forming means for forming a third sensed image signal having the first resolution by performing a computing process on the first sensed image signal generated by the first image sensing means and the second sensed image signal generated by the second image sensing means;

recording image signal forming means for forming a first recording image signal which corresponds to the first and second sensed image signals generated by the first and second image sensing means and a second recording image signal which corresponds to the third sensed image signal formed by the third sensed image signal forming means; and recording means for selectively recording on the recording medium one of the first and second recording image signals formed by the recording image signal forming means.

It is another specific object of the invention to provide an image signal recording apparatus which is capable of selectively recording, on a recording medium, image signals of different degrees of resolution by forming these image signals without including any aliasing distortion in each of them.

Under that object, an image signal recording apparatus arranged, according to this invention in one mode of embodiment thereof, to record on a recording medium an image signal obtained by sensing an image of an object to be photographed comprises:

image sensing means, including a first image sensing part and a second image sensing part which has picture elements allocated for the object differently from the first image sensing part, for generating by the first image sensing part a first sensed image signal having a first resolution and for generating by the second image sensing part a second sensed image signal having the first resolution;

third sensed image signal forming means for forming a third sensed image signal having the first resolution by performing a computing process on the first and second sensed image signals generated by the image sensing means;

recording image signal forming means for forming, by using the first and second sensed image signals generated by the image sensing means, a first recording image signal which corresponds to the first sensed image signal and which has the first resolution and a second recording image signal which corresponds to the second sensed image signal and which has the first resolution, and for forming, by using the third sensed image signal formed by the third sensed image signal forming means, a third recording image signal which corresponds to the third sensed image signal and which has the first resolution; and selective supply means, having first and second recording modes, for supplying to the recording image signal forming means the first and second sensed image signals generated by the image sensing means in the first recording mode, and for supplying to the recording image signal forming means the third sensed image signal formed by the third sensed image signal forming means in the second recording mode.

The above and other objects and features of the invention will become apparent from the following detailed description of embodiments thereof taken in conjunction with the accompanying drawings.

BRIEF DESCRIPTION OF THE DRAWINGS

FIGS. 1, 1(A) and 1(B) are diagrams showing in outline the recording part of an electronic still video camera system arranged according to this invention as an embodiment thereof.

FIGS. 5, 5(A) and 5(B) are diagrams showing in outline the reproducing part of the electronic still video camera system arranged as the embodiment of this invention.

DETAILED DESCRIPTION OF THE PREFERRED EMBODIMENTS

Figure 1B:
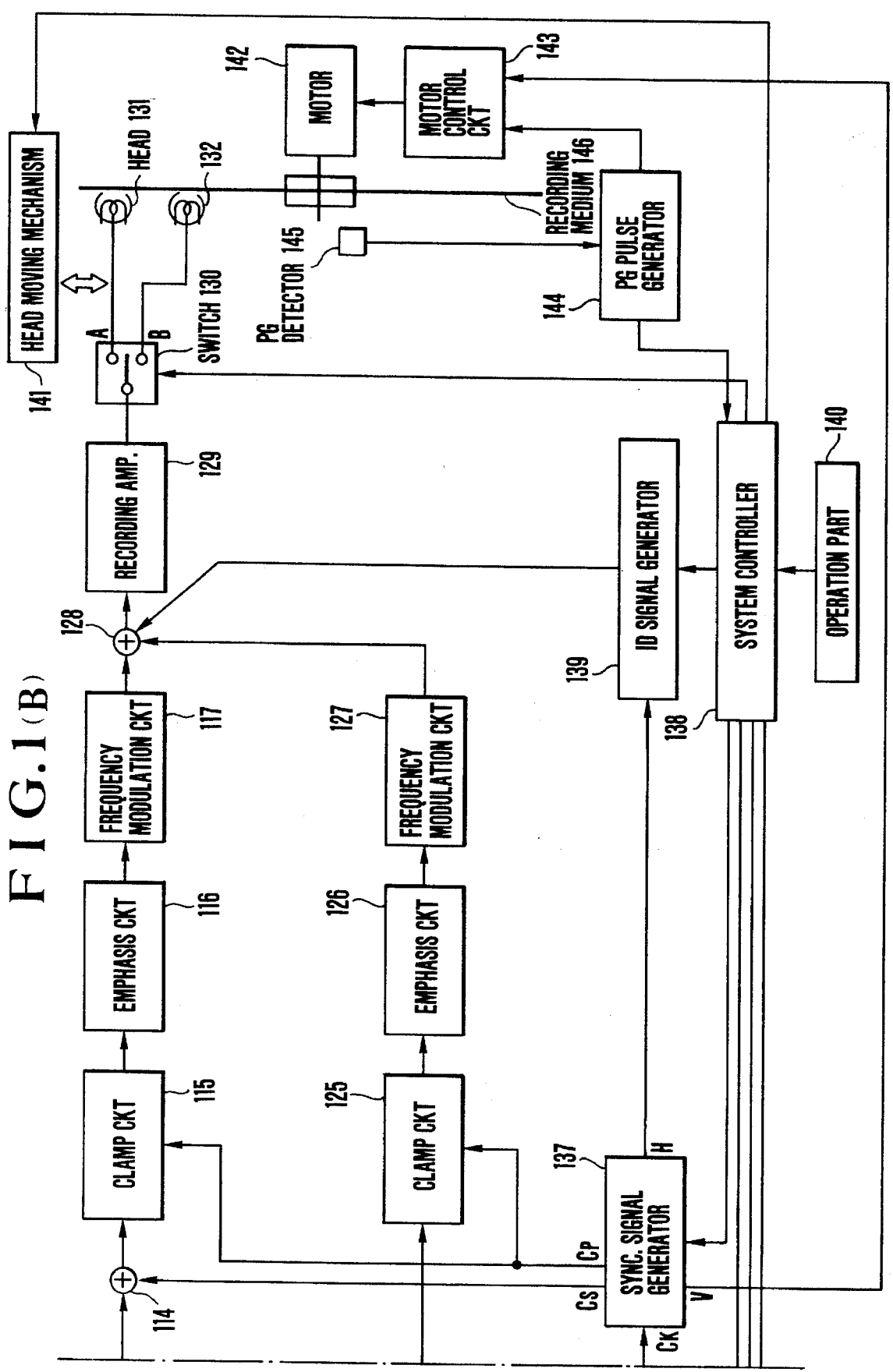

The details of this invention are described below through an embodiment thereof:

FIGS. 1, (1A) and (1B) show in outline the arrangement of the recording part of an electronic still video camera which is arranged according to this invention as an embodiment thereof. Referring to FIGS. 1, 1(A) and 1(B), the recording operation of the recording part of the still video camera is performed as follows: When a system controller 138 is instructed through an operation part 140 to begin recording, an incident light flux representing an image of an object to be photographed (not shown) is supplied to a prism 103 via an optical lens 101 and a shutter 102 which is controlled by the system controller 138. The prism 103 then divides and supplies the incident light to the image sensing planes of three solid-state image sensors 107, 108 and 109. As a result, sensed images of one and the same object are formed on the image sensing plane of the three solid-state image sensors 107, 108 and 109 respectively.

In the case of this specific embodiment, optical low-pass filters (LPFs) 104, 105 and 106 are inserted in the optical paths between the prism 103 and the solid-state image sensors 107, 108 and 109. The LPFs 104 and 105 are arranged to cause sensed images of the same spatial frequency to pass therethrough. The LPF 106 is arranged to cause only the sensed image of a spatial frequency which is lower than the highest spatial frequency passable through the optical LPFs 104 and 105 to pass therethrough. The image sensing plane positions of the solid-state image sensors 107, 108 and 109 in relation to an object's image obtained are arranged as follows: The position of the solid-state image sensor 108 deviates from that of the solid-state image sensor 107 to an extent corresponding to ½ picture element in the vertical direction. The position of solid image sensor 108 can also deviate in the horizontal direction. The positions of the image sensors 109 and 107 are the same relative to the object's image.

Each of the solid-state image sensors of this embodiment is, for example, an MOS type image sensor having about 500 picture elements in the vertical direction and about 1200 picture elements in the horizontal direction. For the picture elements aligned in the horizontal direction, the MOS type image sensors 107 and 108 are arranged to have the signals of the odd-number-th picture elements read out by a signal line different from a signal line provided for reading out the even-number-th picture elements. The MOS type image sensor 109 is arranged in about the same manner as the MOS type image sensors 107 and 108 and to have the signals of its picture elements read out in a manner which will be described later herein.

Figure 2:
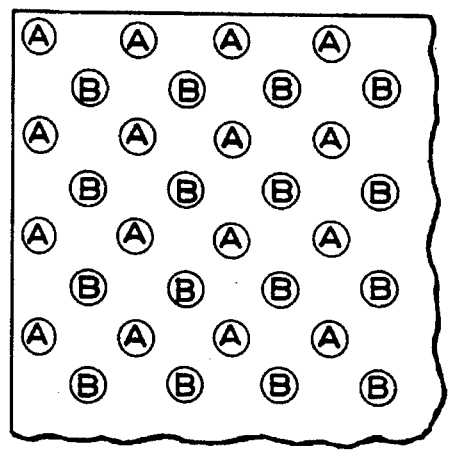
FIG. 2 shows the allocation of picture elements corresponding to video signals output from a solid-state image sensor shown in FIG. 1(A).

Green filters which are not shown are provided on the image sensing planes of the solid-state image sensors 107 and 108. When the system controller 138 is instructed through the operation part 140 to initiate a recording operation, the system controller 138 instructs a synchronizing signal generator 137 to begin to operate. The synchronizing signal generator 137 supplies a clock signal Ck to an image sensor driving circuit 136. Then, in synchronism with the clock signal Ck, the image sensor driving circuit 136 drives the solid-state image sensors 107, 108 and 109. In response to this, video signals consisting of the signals of different picture elements on the image sensing plane are output from the output terminals A and B of each of the solid-state image sensors 107, 108 and 109. More specifically, a video signal obtained from the picture elements indicated by marks Ⓐ in FIG. 2 is output from the terminal A of each of the image sensors 107, 108 and 109. A video signal obtained from the picture elements indicated by marks Ⓑ in FIG. 2 is output from the other terminal B of each of these image sensors. Each of the video signals thus output is supplied to switches 110, 119, 120, 134, 135, 147 and 148 shown in FIG. 1(A) as applicable.

The recording part of the still video camera system which is arranged for this specific embodiment of the invention has two operation modes including: A normal recording mode in which a video signal is recorded in a form conforming to the format of the conventional electronic still video camera; and a high-fineness recording mode in which the video signal is recorded in a form which has a higher degree of fineness than the conventional format. The recording part performs a recording operation in one of these two recording modes. The mode is selected by means of the operation part 140 and the system controller 138 is informed of the mode selection accordingly. In the case of the normal recording mode, the system controller 138 turns off the switches 119 and 148. At the same time, the connecting positions of the switches 110 and 120 are shifted to their sides L respectively. In the event of the high-fineness recording mode, the switches 119 and 148 are turned on while the positions of the switches 110 and 120 are shifted to their other sides H (see FIG. 1(A)).

Assuming that the embodiment is set in the high-fineness recording mode by the operation part 140, the recording operation is performed as described below:

In this instance, the position of the switch 110 is on the side H while the switch 148 is turned on as mentioned above. Under this condition, the video signal output from the terminal A of the solid-state image sensor 107 is supplied to an LPF 111 via the switch 110. The video signal output from the terminal B of the solid-state image sensor 108 is supplied via the switch 148 to an LPF 118.

The solid-state image sensors 107 and 108 are respectively provided with green (G) color filters which are not shown. Further, as mentioned in the foregoing, their image sensing plane positions deviate as much as ½ picture element relative to the object's image. As a result of this, the allocation of picture elements in the video signals output from the switches 110 and 148 becomes as shown in FIG. 3.

Figure 3:
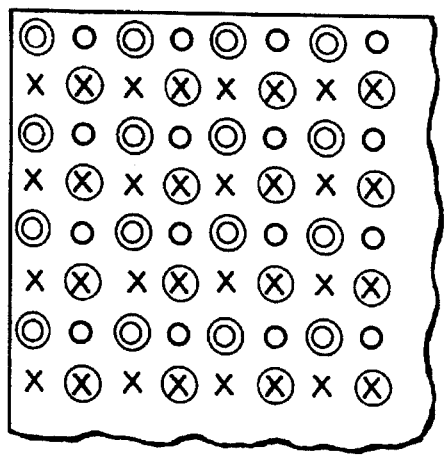
FIG. 3 shows the allocation of picture elements corresponding to video signals output from solid-state image sensors 107 and 108 shown in FIG. 1(A).

In FIG. 3, marks ○, indicate the allocation of picture elements of the image sensing plane of the solid-state image sensor 107. The signals of picture elements indicated by marks ⊙, in FIG. 3 are supplied via the switch 110 to the LPF 111. Marks X of FIG. 3 indicate the allocation of picture elements of the image sensing plane of the solid-state image sensor 108. The signals of picture elements indicated by marks ⊗ in FIG. 3 are supplied via the switch 148 to the LPF 118.

Figure 4:
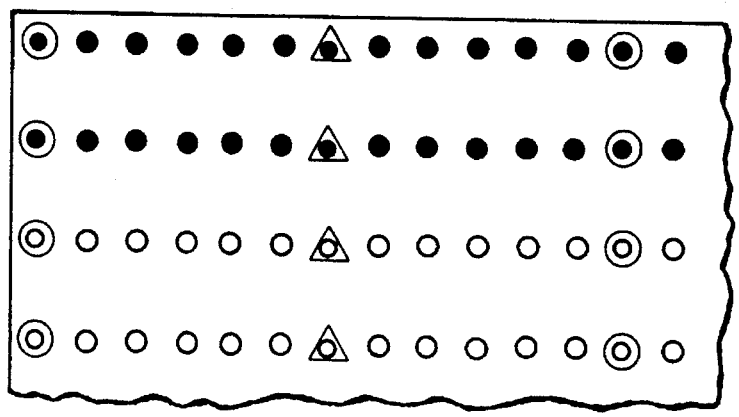
FIG. 4 shows the allocation of picture elements corresponding to a video signal output from a solid-state image sensor 109 shown in FIG. 1(A).

Meanwhile, the connecting position of the switch 120 is on one side H thereof while the switch 119 is closed in the case of the high-fineness recording mode. Therefore, the video signal output from the terminal A of the solid-state image sensor 109 is supplied to an LPF 121 via the switches 119 and 120. Further, the image sensing plane of the solid-state image sensor 109 is provided with an R-B color filter which has red (R) and blue (B) colors alternately arranged as shown in FIG. 4. In FIG. 4 marks ● indicate the red (R) color parts and marks ○ the blue (B) color parts of the filter. The allocation of picture elements in the video signal output from the switch 120 becomes as shown in FIG. 4.

In other words, the picture elements indicated by the marks ≡ in FIG. 4 show the allocation of picture elements of R (red) on the image sensing plane of the solid-state image sensor 109. The picture elements indicated by the marks ○ in FIG. 4 show the allocation of picture elements of B (blue). Further, signals of picture elements indicated by marks⊙ and ⊙ in FIG. 4 are supplied from the switch 120 to an LPF 121 as an R and B signals corresponding to a signal G1 which will be described later. Signals of picture elements indicated by marks ₳ and₳ in FIG. 4 are supplied from the switch 120 to the LPF 121 as R and B signals corresponding to a signal G2 which will also be described later.

While the R and B signals are arranged to be read out from the solid-state image sensor 109 in the above-stated manner, an image sensor driving circuit 136 is arranged to drive the image sensor 109 in such a way as to cause one frame portion of the R and B signals to be serially output from the solid-state image sensor 109.

Of the LPFs 111, 118 and 121 to which the video signals output from the solid-state image sensors 107, 108 and 109 are supplied, the LPFs 111 and 118 have the same frequency band signal passing characteristic. Meanwhile, the LPF 121 has a characteristic of causing signals of a frequency band which is narrower than the frequency band passable by the LPFs 111 and 118 to pass therethrough. This is because the video signal output from the solid-state image sensor 109 is used mainly for forming a chrominance signal while the video signals output from other solid-state image sensors 107 and 108 are used mainly for forming a luminance signal. Therefore, compared with the outputs of the image sensors 107 and 108, the output of the image sensor 109 does not have to be of a wide frequency band. In addition to that, in accordance with the recording format, a narrow frequency band is assigned to the chrominance signal.

The signals which have been band-limited through the LPFs 111 and 118 are supplied to a switch 112. The switch 112 is arranged to perform a selecting action under the control of the system controller 138. The system controller 138 causes the switch 112 to shift its connecting positions from one side A to the other side B thereof in a cycle of one frame to serially supply the signals from the LPFs 111 and 118 to a camera processing circuit 113. The signal which has been band-limited through the LPF 121 is supplied to another camera processing circuit 122.

The camera processing circuit 113 receives one frame portion of the green component of the video signal which has been output from the solid-state image sensor 107 and has been band-limited by the LPF 111 (hereinafter referred to as a signal G1), the red component of the video signal which has been output from the solid-state image sensor 109 for a period of time during which the signal G1 is output and has been band-limited by the LPF 121 (hereinafter referred to as a signal R1) and the blue component of the video signal (hereinafter referred to as a signal B1). The circuit 113 synchronizes the input signals R1 and B1 by means of a one horizontal scanning period (H) delay line or the like. A luminance signal Y1 is formed by adding these synchronized signals together in a suitable ratio. Further, after the signals G1, R1 and B1 are processed in the above-stated manner, the circuit 113 receives another one frame portion of the green component of the video signal which has been output from the solid-state image sensor 108 and has been band-limited by the LPF 118 (hereinafter referred to as a signal G2), the red component of the video signal which has been output from the solid-state image sensor 109 for a period of time during which the signal G2 is output and has been band-limited by the LPF 121 (hereinafter referred to as a signal R2) and the blue component of the video signal (hereinafter referred to as a signal B2). Then, a luminance signal Y2 is formed likewise by synchronizing the input signals R2 and B2 and by adding these signals in a suitable ratio. The circuit 113 then produces the luminance signals Y1 and Y2 after processing them including a gamma correction process, etc.

The other camera processing circuit 122 serially receives the signals R1, B1, R2 and B2 which have been output from the solid-state image sensor 109 and have been band-limited by the LPF 121. The circuit 122 processes these signals R1, B1, R2 and B2 including gamma correction, etc. and serially produces the processed signals.

The luminance signals Y1 and Y2 serially formed by the camera processing circuit 113 is supplied to an addition circuit 114. At the circuit 114, a composite synchronizing signal Cs which is generated by the above-stated synchronizing signal generator 137 and consists of horizontal and vertical synchronizing signals is multiplexed with the luminance signals Y1 and Y2. The output of the addition circuit 114 is supplied to a clamp circuit 115 to be clamped in a known manner in synchronism with a clamp pulse Cp which is output also from the synchronizing signal generator 137.

The luminance signals Y1 and Y2 which have the composite synchronizing signal added thereto and have undergone the clamp process are supplied to an emphasis circuit 116 and a frequency modulation circuit 117 to be serially converted into frequency-modulated luminance signals in conformity to the known format of electronic still video cameras. The frequency-modulated luminance signals are supplied to an adder 128.

Further, the band-limited signals R1, B1, R2 and B2 which have been output from the camera processing circuit 122 are supplied to a subtracter 124. To the subtracter 124 are also supplied the luminance signals Y1 and Y2 which have been output from the camera processing circuit 113 and then band-limited by an LPF 123. At the subtracter 124, the luminance signals Y1 and Y2 are subtracted respectively from the signals R1, B1, R2 and B2. As a result, color-difference line-sequential signals (R1-Y1)/(B1-Y1) and (R2-Y2)/(B2-Y2) are formed and supplied to a clamp circuit 125.

At the clamp circuit 125, the color-difference line-sequential signals (R1-Y1)/(B1-Y1) and (R2-Y2)/(B2-Y2) are serially subjected to a known clamp process which is carried out in accordance with the clamp pulse Cp output from the synchronizing signal generator 137. The signals thus processed are supplied to an emphasis circuit 126 and a frequency modulation circuit 127 to be converted into frequency-modulated color-difference line-sequential signals in conformity to the format of electronic still video camera. The converted signals are supplied to an adder 128. To the adder 128 is also supplied an index signal (hereinafter referred to as an ID signal) which corresponds to information set at the system controller 138 such as information on the recording date including the year, month and day or the recording time including hour, minute and second. The ID signal is generated by an ID signal generator 139 during at least a part of a period corresponding to the vertical fly-back time of the video signal in synchronism with a signal 13fH having a frequency 13 times as high as the frequency of the horizontal synchronizing signal H supplied from the synchronizing signal generator 137.

The adder 128 receives, as mentioned above, the frequency-modulated luminance signals Y1 and Y2, the frequency-modulated color-difference line-sequential signals (R1-Y1)/(B1-Y1) and (R2-Y2)/(B2-Y2) and the ID signal, each of these signals being supplied by one-frame portion thereof at a time. The signals of three kinds thus supplied are frequency-multiplexed together by the adder 128. The adder 128 thus outputs two frame portions of a recording video signal conforming to the known format prescribed for electronic still video cameras. The recording video signal is supplied to a change-over switch 130.

Meanwhile, a magnetic disc 146 is driven to rotate by a motor 142 before an instruction is given from the operation part 140 for starting a recording operation. The motor 142 is controlled by a motor control circuit 143 to rotate at a given phase relative to the vertical synchronizing signal V output from the synchronizing signal generator 137. More specifically, the motor 142 is controlled as follows: The position of a PG pin which is not shown but is provided on the magnetic disc 146 is detected by a PG detector 145. The PG detector 145 causes a PG pulse generator 144 to generate a PG detection pulse every time the PG pin is detected to have come past the detector 145. The PG detection pulse thus generated is supplied to the motor control circuit 143 along with the vertical synchronizing signal V generated by the synchronizing signal generator 137. The motor control circuit 143 then controls the motor 142 in such a way as to have the two inputs in a given phasic relation. The magnetic disc 146 is thus rotated in synchronism with the vertical synchronizing signal V.

The PG detection pulse output from the PG pulse generator 144 is supplied to the system controller 138. The system controller 138 causes the connecting position of the change-over switch 130 shifted between its two sides A and B in synchronism with the PG detection pulse. With the switch 130 thus operated, the one frame portion of the recording video signal which has been output from the adder 128 and then amplified by a recording amplifier 129 is supplied to one of magnetic heads 131 and 132 which are aligned along the radius of the magnetic disc 146 by switching the connection of the switch 130 to them from one over to the other for every one-frame portion of the recording video signal. As a result, one frame portion of the recording video signal is recorded in two recording tracks on the magnetic disc 146. Upon completion of recording one frame portion of the recording video signal, the system controller 138 causes a head moving mechanism 141 to shift the positions of the magnetic heads 131 and 132 inward on the disc 146 to an extent corresponding to two tracks. Following that, another one frame portion of the recording video signal consisting of the signals Y2, (R2-Y2), (B2-Y2), etc. is recorded in two recording tracks on the disc 146 in the same manner as the manner described above.

The magnetic heads 131 and 132 are movable by the head moving mechanism 141 in the radial direction of the magnetic disc 146. With the operation part 140 operated, the system controller 138 supplies a head moving instruction signal to the head moving mechanism 141. Then, in response to this signal, the magnetic heads 131 and 132 are movable to any desired positions on the magnetic disc 146 by the head moving mechanism 141.

In a case where the operation part 140 is operated to instruct the system controller 138 to have a recording action performed in the normal recording mode, the recording part of this embodiment operates as follows:

Referring to FIGS. 1, 1(A) and 1(B), in the normal recording mode, the system controller 138 turns off the switches 119 and 148 and shifts the positions of the switches 110 and 120 to their sides L respectively. The video signals output from the output terminals A and B of the solid-state image sensor 107 are supplied to a switch 134. The video signals output from the output terminals A and B of the solid-state image sensor 108 are supplied to a switch 147. The video signals output from the output terminals A and B of the solid-state image sensor 109 are supplied to a switch 135.

Each of the switches 134, 135 and 147 is arranged to alternately output the signals obtained from the output terminals A and B of the applicable solid-state image sensors in such a manner that the signals of the picture elements aligned on the image sensing plane of each solid-state image sensor are produced in the order of their alignment (in the order of Ⓐ, Ⓑ, . . . ) in the horizontal alignment direction as shown in FIG. 2. The change-over actions of these switches 134, 135 and 147 are controlled to be performed in synchronism with the timing of the driving action of an image sensor driving circuit 136.

The signals output from the switches 134 and 147 are supplied to an adder 149 to be added together. The output of the adder 149 is multiplied by ½ by a coefficient multiplier 150. In other words, the positions of the image sensing planes of the solid-state image sensors 107 and 108 differ from each other to an extent corresponding to ½ picture element. Therefore, the coefficient multiplier 150 is arranged to produce a sensed image signal corresponding to a mean value of the video signals output from the solid-state image sensors 107 and 108. The signal thus output from the coefficient multiplier 150 is supplied via one side L of the switch 110 to the LPF 111. The video signal output from the solid-state image sensor 109 via the switch 135 is supplied via the switch 120 to the LPF 121. The signals of picture elements are thus arranged to be over-sampled in the horizontal direction and averaged in the vertical direction. This arrangement greatly reduces the generation of an aliasing distortion.

The subsequent processes of the recording operation are performed in the same manner as in the case of the high-fineness recording mode. One frame portion of the video signal is eventually recorded in two recording tracks on the magnetic disc 146 in the normal recording mode.

With the recording part of the electronic still video camera system of FIGS. 1, 1(A) and 1(B) arranged as described above, the video signal of a high degree of fineness can be recorded without any aliasing distortion in conformity to the format of the conventional still video camera.

Further, for the purpose of enabling the reproducing part of the system which will be described later to eliminate any time base variations of the video signal occurring during a reproducing operation, the recording part of the still video camera system of this embodiment is arranged to have the signal 13fH output from the ID signal generator 139 in synchronism with the horizontal synchronizing signal output from the synchronizing signal generator 137 and to have the signal 13fH used as a reference signal and recorded on the magnetic disc 146 along with the recording video signal.

An ID signal which is output from the ID signal generator 139 is generated in synchronism with the above-stated signal 13fH at least during a part of a period corresponding to the vertical fly-back time of the video signal. With the exception of that period, the signal 13fH is generated in such a manner that the zero-crossing point of the signal coincides with the rising point of the horizontal synchronizing signal H output from the synchronizing signal generator 137.

Figure 5A:
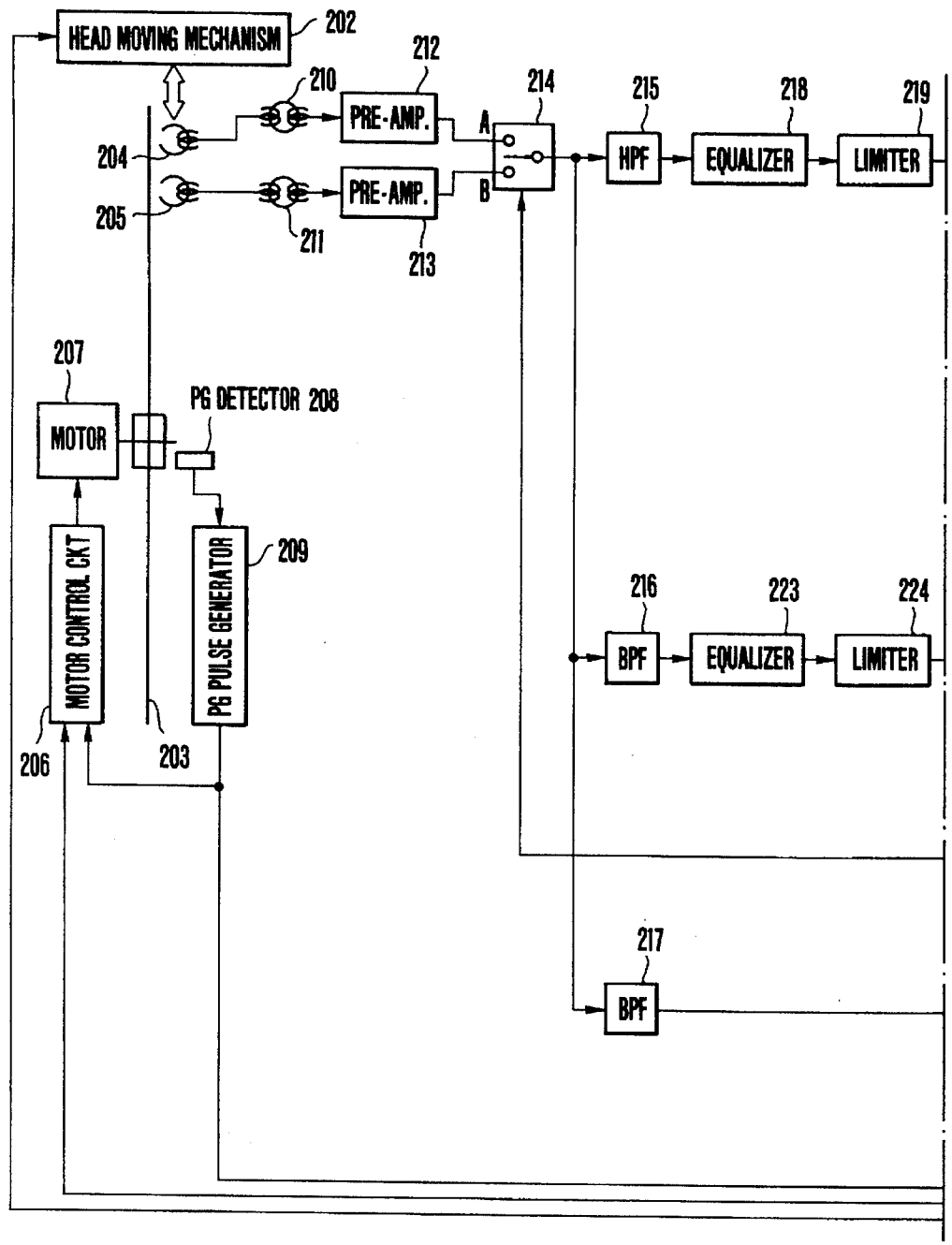
Figure 5B:
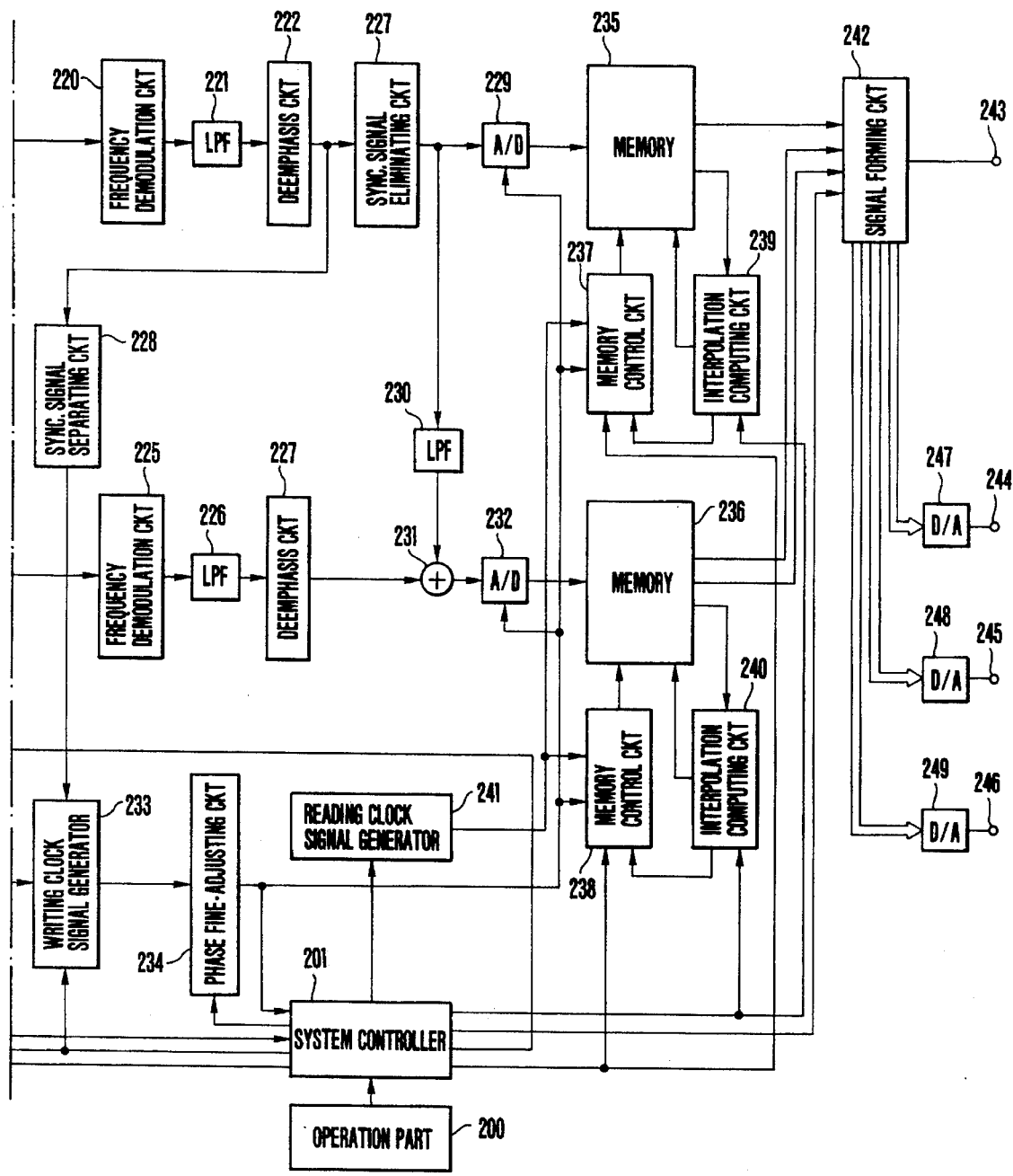

FIGS. 5, 5(A) and 5(B) show in outline the arrangement of the reproducing part of the electronic still video camera system of this embodiment. The reproducing part of the still video camera system operates as described below:

The reproducing part of the still video camera system arranged according to this invention is capable of reproducing both the video signal recorded by the recording part in the normal recording mode and the video signal recorded by the recording part in the high-fineness recording mode. The reproducing operation of the reproducing part on the video signal recorded on a magnetic disc in the high-fineness recording mode is as follows:

Referring to FIGS. 5, 5(A) and 5(B), when an instruction for starting a reproducing action is given by means of an operation part 200 along with designation of the track number of a track having the record to be reproduced, a system controller 201 instructs a head moving mechanism 202 to move magnetic heads 204 and 205 to the applicable record track on a magnetic disc 203.

Meanwhile, with the reproducing action directed to begin by the operation part 200, the system controller 201 instructs a motor control circuit 206 to operate. Then, a motor 207 is controlled to drive and rotate the magnetic disc 203 at a given phase relative to a vertical synchronizing signal V supplied from the system controller 201. More specifically, a PG detector 208 detects the position of a PG pin which is not shown but is disposed on the magnetic disc 203 and causes a PG pulse generator 209 to generate a PG detection pulse every time the PG pin goes past the PG detector 208. The PG detection pulse thus generated is supplied to the motor control circuit 206 along with the vertical synchronizing signal generated by the system controller 201. The motor control circuit 206 then controls the motor 207 in such a way as to keep the two inputs in a given phasic relation to each other. The magnetic disc 203 is thus rotated in synchronism with the vertical synchronizing signal V.

The magnetic heads 204 and 205 are moved to adjacent positions on a record track of the magnetic disc 203 by means of the head moving mechanism 202 as mentioned above. After stabilization of the rotation of the magnetic disc 203 caused by the motor 207, signals reproduced by the magnetic heads 204 and 205 from the magnetic disc 203 are amplified respectively by transformers 210 and 211 and, are amplified further by preamplifiers 212 and 213. The reproduced signals amplified by the preamplifiers 212 and 213 are supplied to a change-over switch 214.

The change-over switch 214 is arranged to perform its switching action under the control of the system controller 201. With the PG detection pulse supplied to the system controller 201 from the PG pulse generator 209, the system controller 201 causes the switch 214 to shift its position between two connecting sides A and B thereof in synchronism with the PG detection pulse. This switching action of the switch 214 causes the signals reproduced by the magnetic heads 204 and 205 to be alternately output from the switch 214 in a cycle of one field.

The signal thus output from the change-over switch 214 is supplied to a high-pass filter (HPF) 215 and band-pass filters (BPFs) 216 and 217 respectively.

The HPF 215 which is thus arranged to receive the reproduced signal output from the change-over switch 214 extracts from the reproduced signal a frequency-modulated luminance signal. The frequency-modulated luminance signal thus extracted is supplied to an equalizer circuit 218 to have its frequency characteristic corrected there. After the equalizer circuit 218, the luminance signal is supplied to a limiter circuit 219 to have its level suppressed to a given level for the purpose of preventing it from being inverted. After the limiter circuit 219, the frequency-modulated luminance signal is supplied to a frequency demodulation circuit 220 to be frequency-demodulated through the circuit 220. The frequency demodulated luminance signal is supplied to an LPF 221 to have its redundant frequency component removed there. The signal thus processed by the LPF 221 is supplied to a deemphasis circuit 222 to be subjected to a deemphasizing process which is carried out in a manner reverse to an emphasizing process performed in recording. The deemphasis circuit 222 then produces the processed signal as a luminance signal including a synchronizing signal therein.

At the BPF 216, a frequency-modulated color-difference line-sequential signal is extracted from the reproduced signal received from the change-over switch 214. The signal thus extracted is processed, like in the case of the above-stated luminance signal, by an equalizer circuit 223, a limiter circuit 224, a frequency demodulation circuit 225, an LPF 226 and a deemphasis circuit 227. Through these circuit elements, the signal extracted by the BPF 216 is processed into the state of the original color-difference line-sequential signal.

The luminance signal which is output from the deemphasis circuit 222 and includes a synchronizing signal as mentioned above is supplied to a synchronizing signal eliminating circuit 227 to have the synchronizing signal removed therefrom. After that, the luminance signal is supplied to an analog-to-digital (A/D) converter 229 and also to an LPF 230. The luminance signal has its redundant frequency component removed by the LPF 230 and is then supplied to an adder 231. At the adder 231, the luminance signal is added to the above-stated color-difference line-sequential signal output from the deemphasis circuit 227. The adder 231 then outputs R (red) and B (blue) signals and serially supplies them to an A/D converter 232.

A delay circuit which is not shown is arranged to have the time base of the luminance signal and that of the color-difference line-sequential signal coincide with each other in such a way as to ensure that their corresponding parts are added together by the adding process performed at the adder 231.

The BPF 217 is arranged to extract the signal 13fH from the reproduced signal received through the switch 214 and to supply it to a writing clock signal generator 233. To the writing clock signal generator 233 is also supplied the synchronizing signal which is separated by a synchronizing signal separating circuit 228 from the luminance signal which has been output from the deemphasis circuit 222. The writing clock signal generator 233 forms a writing clock signal for the A/D converters 229 and 232 by using these signals.

The writing clock signal generator 233 operates in the following manner: There arises some time base variations in the reproduced signal obtained by the magnetic head 204 or 205 from the record tracks formed on the magnetic disc 203. The signal 13fH which is separated from the reproduced signal by the BPF 217 also has the same time base variations as the reproduced signal.

Therefore, to have the A/D converters 229 and 232 perform analog-to-digital conversion following the above-stated time base variations, a PLL (phase-locked loop) circuit is provided within the writing clock signal generator 233 for forming the writing clock signal in phase with the signal 13fH separated by the BPF 217.

Further, as described in the foregoing, the video signal is recorded in such a way as to have the rising point of the horizontal synchronizing signal of the video signal coincide with the zero-crossing point of the signal 13fH. Therefore, in forming the writing clock signal at the writing clock signal generator 233, the signal 13fH supplied from the BPF 217 is phase-controlled before the writing clock signal is formed by the PLL circuit within the writing clock signal generator 233 in such a way as to have the rising point of the horizontal synchronizing signal which is separated by and supplied from the synchronizing signal separating circuit 228 coincide with the zero-crossing point of the signal 13fH separated by and supplied from the BPF 217.

The writing clock signal which has been formed in the above-stated manner is supplied to a phase fine-adjusting circuit 234. This circuit 234 is provided for fine adjustment of the phase of the writing clock signal by a manual operation on the operation part 200. The phase fine-adjusting circuit 234 permits the operator to make fine phase adjustment of the writing clock signal to its optimum phase by operating the operation part 200 while watching an image obtained on a monitor from the reproduced video signal.

The writing clock signal output from the phase fine-adjusting circuit 234 is supplied to the A/D converters 229 and 232. The luminance signal, the R signal and the B signal supplied to these converters 229 and 232 are analog-to-digital converted on the basis of the writing clock signal output from the phase fine-adjusting circuit 234. As a result, the A/D converter 229 produces and supplies a digital luminance signal to a memory 235. The A/D converter 232 produces and supplies a digital R signal and a digital B signal to another memory 236. Meanwhile, memory control circuits 237 and 238 have been set by the system controller 201 into a writing control state. These memory control circuits 237 and 238 operate on the basis of the writing clock signal output from the phase fine-adjusting circuit 234 to designate writing addresses of the memory 235 and 236. The signals received are thus stored by the memories 235 and 236.

One frame amount of digital luminance signal and that of the digital R and B signals which are obtained from the signals reproduced from two record tracks on the magnetic disc 201 is thus stored. The system controller 201 detects completion of the storing action on the one frame amount of signals by counting the pulses of the writing clock signal output from the phase fine-adjusting circuit 234. Then, the system controller 201 instructs the head moving mechanism 202 to move the magnetic heads 204 and 205 inward over the magnetic disc 203 to an extent corresponding to two tracks. After that, another one frame amount of digital luminance signal and that of digital R and B signals are obtained from the reproduced signals reproduced from the newly accessed two record tracks in the same manner as described above. The memories 235 and 236 then again store digital signals. When completion of the storing action of the memories 235 and 236 on the one frame amount of the digital luminance signal and that of the digital R and B signals is detected by the system controller 201, the memory control circuits 237 and 238 are brought into reading control states by the system controller 201. The system controller 201 further instructs an interpolation computing circuits 239 and 240 to begin their interpolation processing.

Figure 6A:
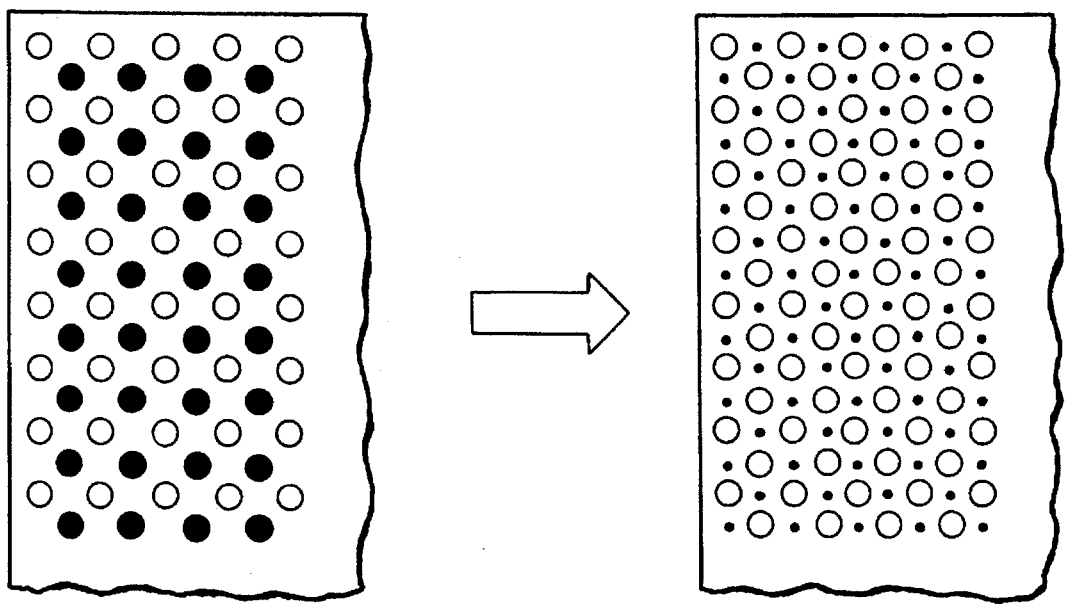
FIGS. 6(A), 6(B) and 6(C) show the allocation of picture elements corresponding to video signals recorded on a magnetic disc in a high-fineness recording mode by the still video camera of this embodiment as in relation to the allocation of picture elements to be interpolated during the process of reproduction.
Figure 6B:
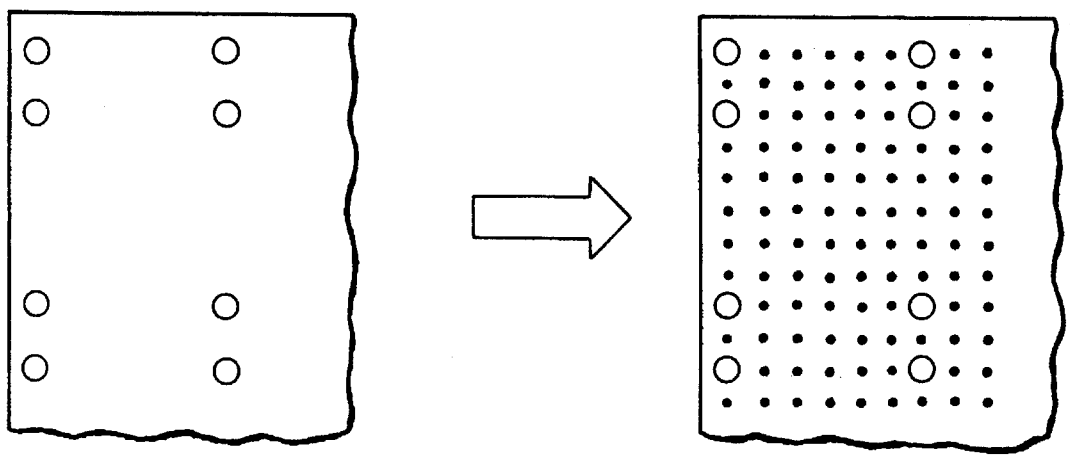
Figure 6C:
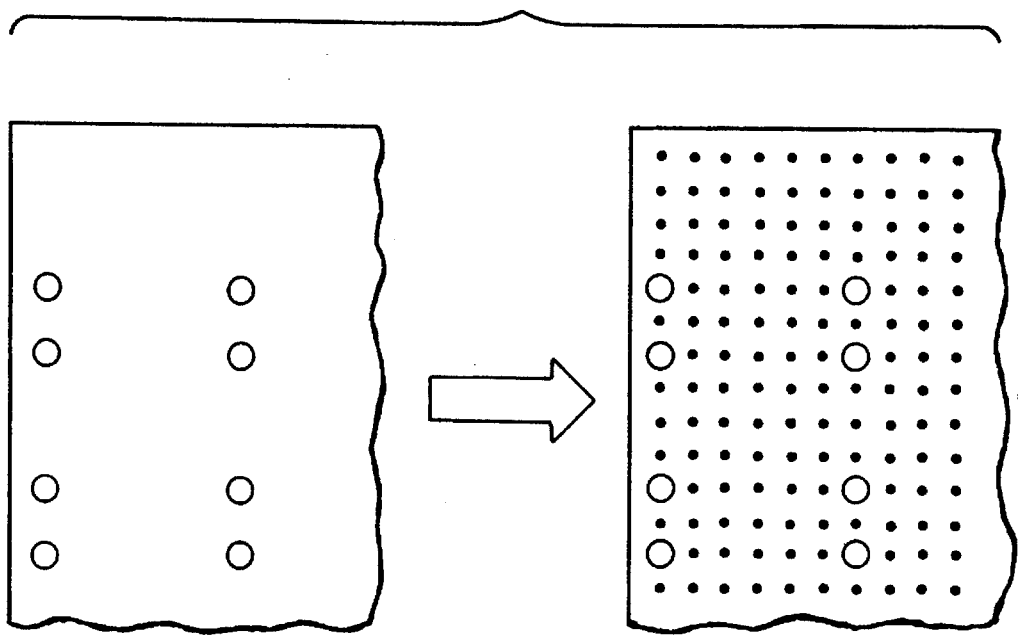

In the case of this embodiment, the above-stated interpolation processing is performed as described below:

Referring to FIGS. 6(A), 6(B) and 6(C), the positions on the image sensing plane of picture elements corresponding to the digital luminance signal stored in the memory 235 are indicated by marks ○ on the right-hand side illustration in FIG. 6(A). The positions on the image sensing plane of picture elements corresponding to the digital R and B signals stored in the memory 236 are indicated by marks ○ on the right-hand side illustrations in FIGS. 6(B) and 6(C). The interpolation processing of the embodiment is performed by using interpolation filters. The filters interpolate the picture element data indicated by marks • in FIGS. 6(A), 6(B) and 6(C) with data indicated by marks○ and ● and located around them. The interpolation filters are composed of the picture element data indicated by the marks ○ and ● located around the marks •. The interpolation computing circuits 239 and 240 instruct the memory control circuits 237 and 238 to read out from the memories 235 and 236 the picture element data required for the interpolation processing to be carried out by means of the above-stated interpolation filters; and to supply the read-out data to the interpolation computing circuits 239 and 240. In response to this instruction, the memory control circuits 237 and 238 control the reading addresses of the memories 235 and 236 in such a way as to have the required picture element data taken in the interpolation computing circuits 239 and 240. The interpolation computing circuits 239 and 240 then form interpolation image data corresponding to the marks • shown in FIGS. 6(A), 6(B) and 6(C) by using the picture element data taken in and supply the interpolation image data to the memories 235 and 236. At that time, the memory control circuits 237 and 238 provide the memories 235 and 236 with writing addresses for storing the above-stated interpolation image data to have the data stored in the memories 235 and 236.

With the interpolation processing performed in the above-stated manner, the memories 235 and 236 store picture element data for about 1200×1000 picture elements or per picture. Further, compared with the luminance signal, the color signals do not have much information recorded on the magnetic disc 203. Therefore, the resolution cannot be increased because of a greater amount of interpolating picture element data to be formed by the interpolation processing. However, this presents no problem as the image quality deterioration due to this is not conspicuous to the visual sensation of human.

After completion of the interpolation processing performed on the memories 235 and 236 in the above-stated manner, the system controller 201 instructs the reading clock signal generator 241 to supply the reading clock signal to the memory control circuits 237 and 238. Then, the memory control circuits 237 and 238 read out the digital luminance signal and the R and B signals from the memories 235 and 236 in synchronism with the reading clock signal supplied. The signals thus read out are supplied to a signal forming circuit 242 respectively.

The signal forming circuit 242 consists of a matrix circuit, a synchronizing signal adding circuit, etc. and is arranged to be capable of forming a video signal in any of varied forms by using the digital luminance signal and digital R and B signals. Further, the circuit 242 is arranged to add a synchronizing signal to the video signal before outputting it. In the case of this specific embodiment, the signal forming circuit 242 is provided with a digital output terminal 243 for producing and supplying a digital video signal to a printer, a personal computer or the like; a high-definition TV output terminal 244 for producing an analog video signal to the high-definition TV standards; an RGB terminal 245 for producing an analog RGB signal; and a NTSC output terminal 246 for producing an analog video signal conforming to the NTSC system standards. The arrangement of the signal forming circuit 242 enables the operator to select a desired output form of the video signal through the operation part 200. The system controller 201 gives the signal forming circuit 242 an instruction corresponding to the output form of the video signal selected by the operator. The signal forming circuit 242 then converts the digital luminance signal, the digital R signal and the digital G signal supplied thereto into a video signal of the output form selected with the synchronizing signal added to the video signal. In a case where the video signal is to be produced in an analog signal form, the digital video signal is converted into an analog signal through digital-to-analog converters 247, 248 or 249 before it is output from the applicable output terminal.

While the reproducing part of the electronic still video camera shown in FIGS. 5, 5(A) and 5(B) reproduces the image signal recorded on a magnetic disc in the high-fineness recording mode by the recording part shown in FIGS. 1, 1(A) and 1(B) in the manner as described above, a video signal recorded on a magnetic disc in the normal recording mode by the recording part is reproduced as follows: Referring again to FIGS. 5, 5(A) and 5(B), one frame amount of the digital luminance signal and that of the digital R and B signals obtained from the reproduced signals from two record tracks of the magnetic disc 201 are stored on the memories 235 and 236. Upon completion of the storing action, the video signal is restored to its original form by carrying out a known suitable interpolation processing by using only the data stored in the memories 235 and 236 without shifting the positions of the magnetic heads 204 and 205 by the head moving mechanism 202.

Further, in this instance, the signal forming circuit 242 does not form an analog video signal that conforms to the high-definition TV standards and no video signal is output from the high-definition TV output terminal 244.

Switch-over from reproduction of a video signal recorded in the normal recording mode to reproduction of a video signal recorded in the high-fineness recording mode and vice versa can be accomplished by operating the operation part 200 to instruct the system controller 201 to have reproduction performed in accordance with the mode. However, this arrangement may be changed as follows: A recording mode identifying code is included in the ID signal recorded along with the video signal. A recording mode discrimination circuit is arranged in the reproducing part to automatically detect the recording mode of the reproduced signal from the recording mode identifying code included in the ID signal recorded along with the reproduced signal from the magnetic disc 201. The system controller 201 is then informed of this and determines a reproduction mode accordingly.

The electronic still video camera system which is arranged as an embodiment of this invention is capable of recording and reproducing a high-fineness video signal in conformity with the format of electronic still video cameras without causing any aliasing distortion as mentioned in the foregoing. In addition to that, the high-fineness video signal can be reproduced without the adverse effects of time base fluctuations or variations that occur during the process of reproduction. Further, in recording a video signal in the normal recording mode, the invented camera system effectively prevents aliasing distortion.

In the case of this embodiment, a high-fineness video signal is formed by using three solid-state image sensors each having about 1200×500 picture elements. A high-fineness video signal also can be formed by using one or two solid-state image sensors each having a greater number of picture elements.

Figure 7:
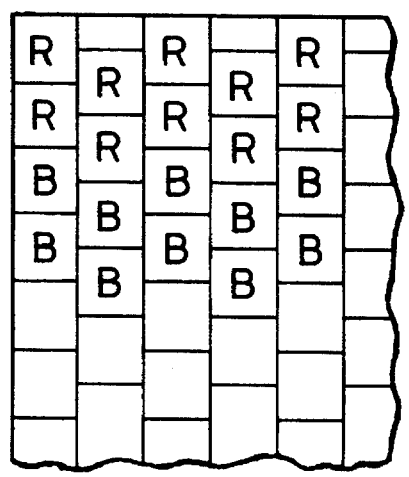
FIG. 7 shows, as another embodiment of the invention, the arrangement of a color filter used by an electronic still video camera system for recording and reproducing a high-fineness video signal with two solid-state image sensors.

In a case where the camera is provided with two solid-state image sensors each having about 1200×1000 picture elements, for example, one for forming a luminance signal and the other for forming color signals, a high-fineness video signal can be formed, in accordance with the invention, by using a color filter which is arranged in a manner as shown in FIG. 7.

Referring to FIG. 7, each grate part corresponds to one picture element of the solid-state image sensor. A reference symbol R represents a color filter part for a red component and a symbol B a color filter part for a blue component.

As mentioned in the foregoing, the embodiment is arranged to retain the interchangeability with the conventional format and yet is capable of recording a video signal with a higher degree of image quality than the conventional still video camera without any aliasing distortion. Further, the embodiment is capable of recording a video signal of the conventional format on a recording medium with about the same degree of image quality as the conventional still video camera without causing any aliasing distortion.

What is claimed is:

1. An image signal recording apparatus for recording on a recording medium an image signal obtained by sensing an object, comprising:

a) first image sensing means for sensing said object and generating a first sensed image signal corresponding to an image having a first resolution;

b) second image sensing means, having picture elements allocated for the object differently from said first image sensing means, for sensing said object and generating a second sensed image signal corresponding to the image having said first resolution and of the same kind as that of said first sensed image signal;

c) third image sensing means for sensing said object and generating a third sensed image signal corresponding to the image of different kind from said first sensed image signal and said second sensed image signal;

d) fourth sensed image signal forming means for forming a fourth sensed image signal corresponding to the image having said first resolution, by performing a computing process using the first sensed image signal generated by said first image sensing means and the second sensed image signal generated by said second image sensing means; and e) recording means having a first recording mode in which a first recording image signal is formed by using the first sensed image signal generated by said first image sensing means, the second sensed image signal generated by said second image sensing means and the third sensed image signal generated by said third image sensing means and said first recording image signal thus formed is recorded on the recording medium and a second recording mode in which a second recording image signal is formed by using the third sensed image signal generated by said third image sensing means and the fourth sensed image signal generated by said fourth sensed image signal forming means and said second recording signal thus formed is recorded on the recording medium, for recording the image signal corresponding to said object on the recording medium according to either one of said first recording mode or said second recording mode.

2. An apparatus according to claim 1, wherein said first image sensing means includes a first image sensor having a first number of picture elements for generating the first sensed image signal.

3. An apparatus according to claim 2, wherein said second image sensing means includes a second image sensor having a number of picture elements equal to the number of picture elements of said first image sensor and having an image sensing plane located in a position deviating both in horizontal and vertical directions from an image sensing plane of said first image sensor relative to the object, for generating the second sensed image signal.

4. An apparatus according to claim 1, wherein said fourth sensed image signal forming means is arranged to compute a mean value of the first sensed image signal generated by said first image sensing means and the second sensed image signal generated by said second image sensing means and to output as the fourth sensed image signal a sensed image signal indicative of said mean value.

5. An apparatus according to claim 1, wherein said recording means includes:

a) input means for receiving in sequence, the first sensed image signal generated by said first image sensing means and the second sensed image signal generated by said second image sensing means;

b) modulating means for modulating the first or second sensed image signal received in sequence by said input means, respectively, and for outputting in sequence the modulated first and second sensed image signals; and c) multiplex means for multiplexing respectively the third sensed image signal generated by said third image sensing means on the first and second sensed image signals modulated by said modulating means, and outputting in succession the third sensed image signal thus modulated.

6. An apparatus according to claim 5, wherein said recording means is arranged to record successively in every picture the signals outputted consecutively from said modulating means on a first track, a second track, a third track and a fourth track on the recording medium.

7. An apparatus according to claim 1, wherein said recording means includes the following:

a) modulating means arranged to receive the fourth sensed image signal formed by said fourth sensed image signal forming means, to modulate the received fourth sensed image signal and to output the modulated fourth sensed image signal; and b) multiplex means for multiplexing respectively the third sensed image signal generated by said third image sensing means on the modulated fourth sensed image signal outputted from said modulating means and outputting the fourth sensed image signal thus modulated.

8. An apparatus according to claim 7, wherein said recording means is arranged to record successively in every picture the signals outputted from said modulating means on first and second tracks on the recording medium.

9. An image signal recording apparatus for recording on a recording medium an image signal obtained by sensing an object, comprising:

a) image sensing means, including a first image sensing part, a second image sensing part which has picture elements allocated for the object differently from said first image sensing part and a third image sensing part to generate a third sensed image signal corresponding to an image of the different kind from that corresponding to a first sensed image signal and a second sensed image signal generated from said first image sensing part and second image sensing part, for sensing said object to generate a first sensed image signal corresponding to an image having a first resolution from said first image sensing part, to generate from said second image sensing part a second sensed image signal corresponding to the image having the first resolution and of the same kind as that of said first sensed image signal and to generate from said third image sensing part a third sensed image signal of the different kind from those of said first sensed image signal and said second sensed image signal;

b) fourth sensed image signal forming means for forming a fourth sensed image signal corresponding to the image having said first resolution by performing a computing process using the first and second sensed image signals generated by said image sensing means;

c) recording image signal forming means for forming a first recording image signal corresponding to the image having the first resolution, by using the first sensed image signal and third sensed image signal generated by said image sensing means and forming a second recording image signal corresponding to the image having the first resolution, by using the second sensed image signal and third sensed image signal generated by said image sensing means, or for forming a third recording image signal corresponding to the image having the first resolution, by using the third sensed image signal generated by said image sensing means and the fourth sensed image signal formed by said fourth sensed image signal forming means; and d) selective supply means, having first and second recording modes, for supplying to said recording image signal forming means the first, second and third sensed image signals generated by said image sensing means in the first recording mode, and for supplying to said recording image signal forming means the third sensed image signal generated by said image sensing means and said fourth sensed image signal formed by said fourth sensed image signal forming means in the second recording mode.

10. An apparatus according to claim 9, wherein said fourth sensed image signal forming means is arranged to compute a mean value of the first and second sensed image signals generated by said image sensing means and to output as a fourth sensed image signal a sensed image signal indicative of said mean value.

11. An apparatus according to claim 9, wherein said recording image signal forming means includes modulating means for modulating the first sensed image signal and the second sensed image signal generated by said image sensing means, or the fourth sensed image signal formed by said fourth sensed image signal forming means, and outputting the modulated signal.

12. An apparatus according to claim 9, further comprising recording means for recording in different areas on the recording medium one picture of the first recording image signal and one picture of the second recording image signal formed by said recording image signal forming means in a first recording mode, and for recording on the recording medium one picture of the third recording image signal formed by said recording image signal forming means in a second recording mode.

* * * * *

UNITED STATES PATENT AND TRADEMARK OFFICE
CERTIFICATE OF CORRECTION

PATENT NO. : 5,550,645

DATED : August 27, 1996

INVENTOR(S): Ryo Fujimoto

It is certified that error appears in the above-identified patent and that said Letters Patent is hereby corrected as shown below:

Col. 5, line 33, change "≡" to -- ● --.

Col. 10, line 27, delete "there".

Signed and Sealed this

Twenty-fifth Day of March, 1997

BRUCE LEHMAN

Attest:

Attesting Officer

Commissioner of Patents and Trademarks